(12) United States Patent
Zondag

(10) Patent No.: US 6,600,958 B1
(45) Date of Patent: *Jul. 29, 2003

(54) MANAGEMENT OF FUNCTIONALITY IN A CONSUMER ELECTRONICS SYSTEM

(75) Inventor: Eduard G. Zondag, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/445,952

(22) PCT Filed: Apr. 22, 1999

(86) PCT No.: PCT/IB99/00720

§ 371 (c)(1),
(2), (4) Date: Dec. 15, 1999

(87) PCT Pub. No.: WO99/55071

PCT Pub. Date: Oct. 28, 1999

(30) Foreign Application Priority Data

Apr. 22, 1998 (EP) .............................. 98201293
Dec. 1, 1998 (EP) .............................. 98204053

(51) Int. Cl.$^7$ .............................................. G05B 19/18
(52) U.S. Cl. .......................................... 700/3; 709/208
(58) Field of Search ............... 700/3, 4, 9; 709/208, 709/222, 220

(56) References Cited

U.S. PATENT DOCUMENTS

| | | | | |
|---|---|---|---|---|
| 5,550,979 A | * | 8/1996 | Tanaka et al. | 709/209 |
| 5,570,085 A | * | 10/1996 | Bertsch | 340/3.54 |
| 5,650,775 A | * | 7/1997 | Van Steenbrugge | 340/825.24 |
| 5,729,686 A | * | 3/1998 | Heck et al. | 709/208 |
| 5,796,352 A | * | 8/1998 | Tanaka et al. | 340/825.24 |
| 5,802,300 A | * | 9/1998 | Tanaka et al. | 709/222 |
| 5,959,536 A | * | 9/1999 | Chambers et al. | 340/636 |
| 6,032,202 A | * | 2/2000 | Lea et al. | 710/8 |
| 6,052,750 A | * | 4/2000 | Lea | 710/72 |
| 6,085,236 A | * | 7/2000 | Lea | 709/220 |
| 6,195,591 B1 | * | 2/2001 | Nixon et al. | 700/83 |
| 6,199,136 B1 | * | 3/2001 | Shteyn | 710/305 |
| 6,282,205 B1 | * | 8/2001 | Lu | 370/465 |
| 6,298,069 B1 | * | 10/2001 | Prabhu et al. | 370/463 |
| 6,314,326 B1 | * | 11/2001 | Fuchu | 700/17 |
| 6,314,447 B1 | * | 11/2001 | Lea et al. | 709/105 |
| 6,389,466 B1 | * | 5/2002 | Zondag | 709/221 |

FOREIGN PATENT DOCUMENTS

EP 0406486 10/1996

* cited by examiner

Primary Examiner—John Follansbee
Assistant Examiner—Edward F. Gain, Jr.

(57) ABSTRACT

A communication system 100 includes a plurality of controller stations 114 and 116, and at least one controlled station 104 to 112. The stations are interconnected via a communication network 120. The functionality of each controlled station is associated with a respective abstract representation, referred to as AR. The AR provides an interface for software elements in the system to control functionality of the controlled station by means of messages exchanged with the AR via the communication network. The AR may be implemented using platform-independent code, such as Java. Each controller station includes control means for executing at least one AR of a controlled station and assigned to the local controller station. The system includes leader selection means for selecting a single one of the controller stations as a leading controller station. AR distribution means of the leading controller station determines which controller station should preferably execute the AR(s) of the respective controlled station(s) and assigns each AR to at most to one of the controller stations.

7 Claims, 1 Drawing Sheet

MANAGEMENT OF FUNCTIONALITY IN A CONSUMER ELECTRONICS SYSTEM

Figure 1:
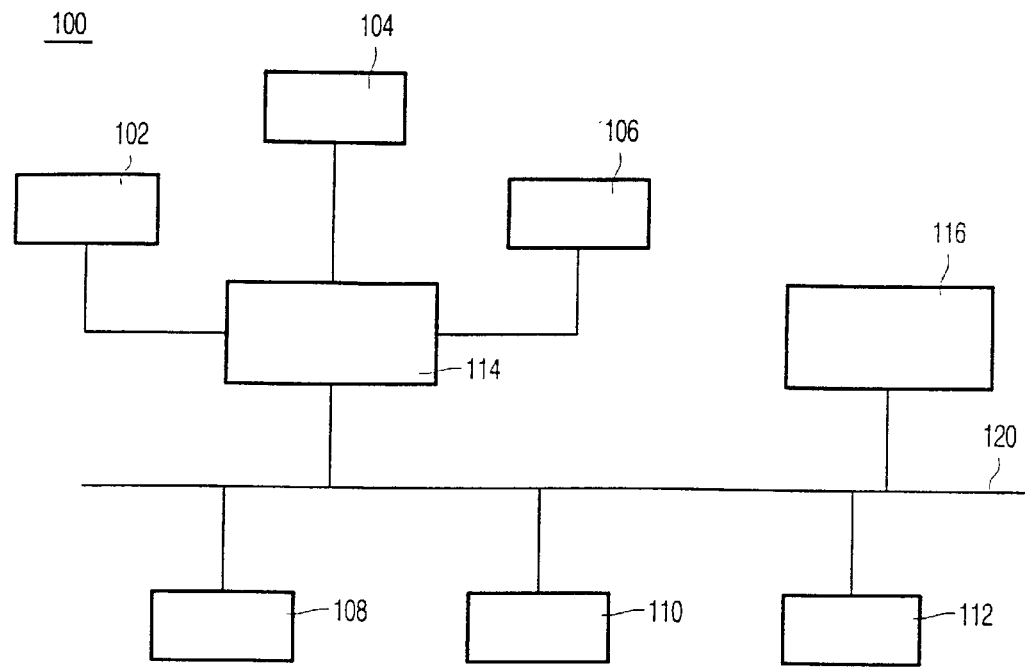

The invention relates to a communication system including a plurality of controller stations and at least one controlled station; the stations being interconnected via a communication network; functionality of each controlled station being associated with a respective abstract representation, referred to as AR, which provides an interface for software elements in the system to control functionality of the controlled station by means of messages exchanged with the AR via the communication network.

The invention further relates to a controller station for use in a communication system including a plurality of controller stations and at least one controlled station; the stations being interconnected via a communication network; functionality of each controlled station being associated with a respective abstract representation, referred to as AR, which provides an interface for software elements in the system to control functionality of the controlled station by means of messages exchanged with the AR via the communication network.

The invention relates in particular to a multimedia consumer electronics system. The consumer electronics industry is moving from mainly analogue operated devices to digitally operated devices. Audio has become digital with the arrival of digital storage media, such as compact disks, and digital broadcasting techniques, such as DAB. Also video is rapidly becoming digital. An all-digital multimedia system with digital audio and digital video opens up new possibilities to the consumer, owing to impressive digital processing and storage capabilities that are becoming available at affordable prices. Moreover, digital communication networks are becoming more powerful at reduced cost.

EP 0,406,486 describes the D2B communication system for consumer electronic devices enabling automatic control of an electronic device via the D2B bus. In this system, a station may act as a controller station, controlling one or more of the other stations, acting as controlled station(s). A controlled station makes its local functionality available in the form of a set of functions, which can be accessed by transferring messages via the D2B bus. The set of functionality can be seen as an abstract representation of the actual underlying functionality, which is provided by the hardware, and/or software of the controlled station. The representation is abstract in the sense that no strict one-to-one relationship between the externally offered functions and the internal implementation is required. Typically, the representation is standardized whereas the actual implementation is vendor or even model specific. Consequently, the controlled station maps the abstract representation (AR) into internal control mechanisms and controls the underlying hardware/software accordingly (e.g. using an internal bus, such as I2C, to control hardware components). Such a mapping and control is usually performed in software. This also covers the functionality required to map the abstract representation to the concrete representation of the underlying hardware/software of the station.

The AR can be controlled using a messaging mechanism. Command messages are defined for each function instructing the controlled station to perform a defined task. Request messages allow information to be retrieved from the controlled station with respect to the execution of a function, such as the state of the station. Event messages enable the controlled station to inform the controlling station of events, such as state changes, which have occurred in the controlled station.

In the controlling station, the task of controlling functionality of another station is assigned to the so-called Audio/Video Controller (AV/C). The AV/C acts independently of any of the other controlling stations. Typically, the AV/C starts a control sequence, usually referred to as feature or application, in reaction to a trigger from a user (e.g. a user has pressed a button on a remote control) or an event which has occurred in the system. A typical example of an application executed by the AV/C is the automatic play feature. For this feature, in response to the user activating the playback function of a VCR (e.g. pressing a play button or inserting a tape), the AV/C instructs the VCR deck to play the tape, instructs the VCR to make the A/V signal originating from the tape available to the TV, and instructs the TV to provide the signal from the VCR to the monitor. It will be appreciated that for this example the controlling AV/C is preferably, although not strictly required, located in either the TV or VCR to reduce the number of command messages. Several AV/Cs may be present in the stations. A station may over time or even simultaneously act as a controlling station or as a controlled station.

In the D2B System, a correspondence was required between on the one hand the feature executed by an AV/C and on the other hand the functions in the controlled station(s). This correspondence has hindered introduction of the system. Typically, a user already possessed an A/V system and replaced or added devices on an individual basis. Obtaining one device which was able to act as a D2B controlling station and/or controlled station did not add functionality to the system, since no partner station was available yet. Only once the user has obtained suitable partner station(s) automatic control functionality provided by the D2B system became available. Moreover, the functionality of the controlling station and the controlled station was static. As an example, the functionality made available by a VCR to the rest of the system was mainly decided by features of existing AV/Cs or AV/Cs under development at the moment of development of the VCR. If at a later moment an AV/C with a new feature was introduced requiring other functions of the VCR, this new AV/C could not co-operate with the existing D2B VCR, even if the hardware of the existing VCR in principle could provide the functionality. Consequently, changing or extending the functionality of the system was cumbersome.

It is an object of the invention to provide a communication system of the kind set forth which is more flexible with respect to the functionality of a controlled station. It is a further object of the invention that functionality of the controlled station can be managed in a user-friendly manner.

To meet the object of the invention, the communication system includes leader selection means for selecting a single one of the controller stations as a leading controller station; and each controller station includes AR distribution means for determining which controller station should execute the AR(s) of the respective controlled station(s); the AR distribution means being operative to, if located in a leading controller station, assign each AR at most to one of the controller stations; and control means for executing at least one AR assigned to the local controller station.

According to the invention, the abstract representation of a controlled station can be executed on a different station, referred to as the controller station. The communication between the AR in the controller station and the actual hardware/software in the controlled station may be performed in any way. This may include any non-standard, proprietary mechanism. In this way a controlled station which itself is not able to provide the desired AR to enable other stations to control it can still be part of the system, albeit controlled indirectly via the controller station. Whereas in the D2B systems only two parties where involved in communication (namely the feature/application in an AV/C of the controller station and the functionality in the controlled station), here three parties are involved: a feature/application (referred to as software element), an AR in a controller station and the controlled station. The feature/application may be located in any of the stations which are capable of issuing control messages to the AR in the controller station. The feature/application may also be located in the controller station itself.

A further advantage of the new architecture is that the functionality provided through the AR of a controlled station can be adjusted or upgraded. As an example, if initially a user had purchased a VCR with a basic AR and a TV with a corresponding basic feature using the basic VCR functionality, according to the invention the user can replace the TV with a new model offering an enhanced feature (although not required) and an enhanced AR of the VCR, where the VCR AR in the TV communicates to the VCR in a proprietary manner (at least for the added functionality). Now not only the new feature in the TV can use the enhanced VCR functionality, but a feature located anywhere in the system can use the enhanced functionality by accessing the VCR AR located in the TV.

To manage allocating ARs to controller stations, according to the invention, a two step approach is used. Firstly, one of the controller stations is elected as the leading controller station. Secondly, the leading controller station assigns the ARs to controller stations in such a way that an AR is at most once assigned. In this way it is avoided that two or more ARs are responsible for access to the same controlled station, which could lead to conflicts. By ensuring that for each controlled station at most one AR is active, conflicts in controlling the controlled station are avoided. Since in principle many stations may be able to act as a controller station, complex synchronization and management issues are avoided by assigning one of the controller stations as leading and as such responsible for assigning ARs to controller stations.

In an embodiment as defined in the dependent claim 2, the leader selection is performed in a simple, distributed manner by each controller station individually deciding whether or not it is the initial leader. The decision is based on unique identifiers of each of the controller stations. Preferably for the unique identifiers the same identifiers are used as used for identifying a station with respect to the network, such as a network address. The identifiers may be stored centrally, e.g. in one of the controller stations, or in a distributed manner, like each controller station storing its own identifier. Using the unique identifiers, each station can simply determine whether it is the leader or not. The decision may, for instance, be based on determining the highest or lowest identifier. Also, other algorithms may be used (e.g. transforming the identifier in a smaller number using a hash function and deciding on this number).

In an embodiment as defined in the dependent claim 3, the lowest order bits of the identifier are given much weight in determining the leader. In this way the situation is avoided that in all or many systems a station of a same vendor acts as the leading station. This situation could occur if a direct decision mechanism were used comparing the values of the identifiers, since typically the higher order bits of an identifier are vendor specific. Since the lower order bits are usually determined sequentially and independently by each manufacturer, this results in a simple way of achieving some randomness in choosing the leader. In this way, in different systems having stations of same manufacturers (e.g. a TV of brand X and a VCR of brand Y) there is a reasonable chance that not in all systems a station of one of the manufacturers will be elected as leader. Advantageously, for one fixed system always the same leader is selected. This may increase consistency in allocating ARs to controller stations, particularly if based on preferences or other information for a controlled station a choice has to be made between equally suitable controller stations. This also increases the consistency in the operation of the system.

In an embodiment as defined in the dependent claim 4, each controller station is associated with a capability indicator, indicating a suitability of the associated controller station to act as the leading controller station (i.e. to manage the assigning of ARs). By using capability indicators, the efficient but rather indiscriminate first selection of a leader is refined in a simple manner. Instead of all controller station(s) having to collect and decide upon the capabilities of all controller stations, this operation is only performed by one station (the initial leader), followed by handing over the responsibility to another controller station if this one turns out to be most capable in deciding where the ARs should be executed. By using only one station (the initial leader) to select the final leader also conflicts which could arise if the capability indicators indicate equally capable stations can be solved simply. For instance, the initial leader chooses one of the most capable stations, e.g. one with a lowest or highest identifier, one which reported its capability indicator first, or in any other suitable way. It is avoided that another station, based on the same data, chooses another station as the most capable one.

In an embodiment as defined in the dependent claim 5, controller stations, which are capable of retrieving updated software for the ARs, are given preference. The software may, for instance, be retrieved from the Internet, from a re-programmable storage, such as a harddisk, in the system, or by inserting an updated storage medium, such as a CD-ROM, in a storage reader. In this way the functionality of the system can be changed or, preferably, enhanced during the lifetime of the products.

To meet the object of the invention, the communication system includes leader selection means for determining whether the controller station is a leading controller station; and the controller station includes: AR distribution means for determining which controller station should execute the AR(s) of the respective controlled station(s); the AR distribution means being operative to, if the controller station has been selected as the leading controller station, assign each AR at most to one of the controller stations in the system; and control means for executing at least one AR assigned to the controller station.

Figure 2:
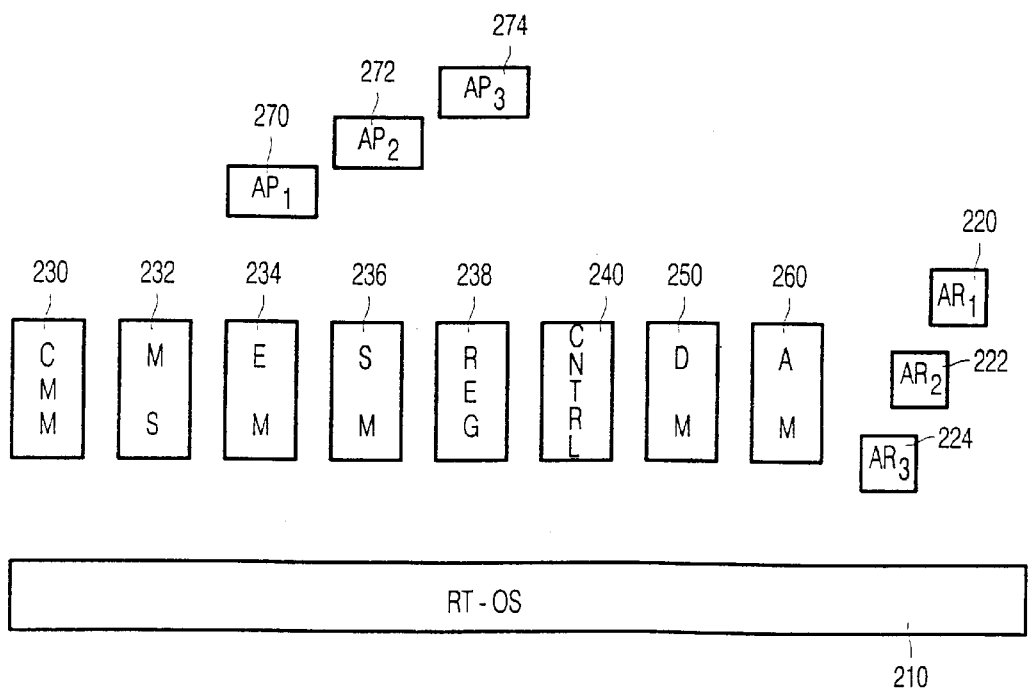

These and other aspects of the invention will be apparent from and elucidated with reference to the embodiments shown in the drawings FIG. 1 is a block diagram of a system with consumer devices according to the invention; and FIG. 2 is a block diagram of the software architecture of a controller station in the system of FIG. 1.

Throughout the figures, same reference numerals indicate similar or corresponding features. Some of the features indicated in the drawings are typically implemented in software, and as such represent software entities, such as software modules or objects.

FIG. 1 is a block diagram of a control system 100 according to the invention. System 100 comprises at least one controlled station; shown are the controlled stations 102, 104, 106, 108, 110, . . . , and 112. System 100 further includes a plurality of controller stations. The figure illustrates the controller stations 114 and 116. The controller stations are connected via the main communication network 120 of the system, for instance based on IEEE 1394, using the same higher-level communication protocols. Controlled stations 102–106 are directly connected to controller station 114. The connection may be via any suitable communication means, such as a proprietary network. Controlled station 108 is connected to the main network 120, but does not use all protocols required to make its AR available for control in a way required for the main network 120. However, station 108 may use other protocols (e.g. proprietary or according to a different standard) and as such be able to communicate to a controller station.

In the system, a distinction is made between controller stations (or, shortly, controllers) and controlled stations. A controller is a station that acts as a host for a controlled station. A controlled station and its controller may reside on the same physical device or on separate devices. A controller is said to host an abstract representation (AR) for the controlled device. The control interface is exposed via the API (Application Program Interface) of this AR. This API is the access point for applications (features) to control the station. For instance, an intelligent television in the family room might be the controller for a number of interconnected controlled stations. A controlled station could contain code that constructs a user interface for the station and allows external control of the station. When such a station is first connected, the controller obtains the user interface and control code. An icon representing the station may then appear on the television screen, and manipulating the icon may cause elements of the control program to actuate the represented station or stations in prescribed ways.

In order to appreciate the operation and versatile character of system 100, a categorization of the communications abilities of consumer electronics stations 102–112 is discussed first. While in reality there is a smoother continuum of device capabilities than is acknowledged here, this categorization is useful in understanding the model of system 100. The communication capabilities of the stations 102–112 in this generic example have different levels of sophistication. Dependent on their communication capabilities, stations 102–112 belong to one of the following classes:

Controller stations

A distinction can be made between the following two types of controller stations:

Full AV Device (FAV)

A Full AV device generally has a rich set of resources and is capable of supporting a complex software environment. The primary distinguishing feature of a FAV is the presence of a runtime environment for executing an abstract representation (AR) for a controlled station. This allows a FAV to upload an AR from other stations or via other local area or wide area communication networks and so provide enhanced capabilities for their control. The FAV may also be able to download applications/features. Preferably, the downloaded code is some form of executable code of a virtual machine (e.g. Java or similar bytecodes). Likely candidates for FAV devices would be Set Top Boxes (STB), Digital TV receivers (DTV), general purpose home control devices, and even Home PC's.

Intermediate AV Device (IAV)

Intermediate AV devices are generally lower in cost than FAV devices and more limited in resources. They do not provide a runtime environment for downloadable ARs and so can not act as controllers for arbitrary devices within the system. However, an IAV may provide native support for control of particular controlled station(s) in the system.

Controlled stations

A distinction can be made between the following two types of controller stations:

Base AV Device (BAV)

These are devices that, for business or resource reasons, choose to implement future-proof behavior by providing an uploadable AR, but the devices themselves do not execute an AR. These devices can be controlled by a controller station (by a FAV device via the uploadable bytecode or by an IAV device via native code). The protocol between the BAV and its controller station typically is proprietary. Communication between a controller station and a BAV device requires that commands for the AR are translated to and from the command protocol used by the BAV device. This translation is performed by the controller station executing the AR.

Legacy AV Device (LAV)

LAV devices are devices that do not comply with the described system architecture and communication protocols. Typically, such devices were built earlier. These devices use proprietary protocols for their control, and usually have simple control-only protocols. Such devices can work in the home network but require that FAV or IAV devices act as a gateway. Communication between a Full or Intermediate AV device and legacy AV device requires that commands be translated to and from the legacy command protocol.

During the course of interaction, stations may exchange control and data in a peer-to-peer fashion. This ensures that, at the communication level, no one device is required to act as a master or controller for the system. However, it also allows a logical master or controller to impose a control structure on the basic peer-to-peer communication model.

Software Architecture

The software architecture of a controller station is shown in FIG. 2. The software elements of the architecture support the basic notions of network management, device abstraction, inter-device communication, and device User Interface (UI) management. Collectively these software elements expose the Interoperability API, a set of services for building portable distributed applications in the system The software elements themselves reside above a vendor specific platform 210, such as a Real-time Operating System. FIG. 2 depicts the arrangement of software elements on a controller station. While not intended as an implementation blueprint, the diagram does highlight how the software elements form a middle layer between platform specific APIs and platform independent applications. An important software element is the Abstract Representation (AR). Indicated are three ARs (220, 222, and 224). The AR is a software element used to control a station. An AR comprises code for the AR itself plus code for Functional Component Modules (FCMs) for each functional component within the controlled station. An FCM is a (software) abstraction of a functional component providing the functionality of that functional component to the software environment and applications. Applications do not communicate with a functional component directly but only through the FCM, the FCM on its turn does not communicate with the functional component directly but always via the AR (this is at least the model used to present the relation). An FCM is an object in the sense that it may be registered as a receiver in a registry (details are provided below) and it can communicate with other objects via a messaging system. A functional component represents functions associated with one identifiable main function of a station. E.g. a VCR AR may comprise separate FCMs for the tape deck and the tuner; a TV AR may comprises separate FCMs for the monitor, PIP (picture in picture display) and tuner. In addition an AR may include a device control application—a software element allowing user control of the device and its functional components. In the Figure, AR 220 represents the functionality of the controller station itself, whereas AR 222 and 224, respectively, represents functionality of two controlled stations.

The controller station comprises control means 240, which provides a runtime environment for ARs (e.g. uploaded ARs) or applications. The controller station further comprises AR distribution means 250 and AR allocation means 260. The AR allocation means 260 allocate an AR, which has been assigned to be executed on this controller station, to the control means 240 for execution. The distribution means 250 performs the task of the AR Manager, which controls installing and removing ARs on controller stations.

ARs are a central concept to the architecture and the source of flexibility in accommodating new devices and features. ARs come in two main types:

embedded AR—an AR pre-installed on a controller station.

uploaded AR—an AR implemented using downloadable code, e.g. bytecode. Uploaded ARs only run on FAV devices.

Preferably, an embedded AR is capable of being used to control a range of controllable stations, such as a range of VCRs of one manufacturer. If so, preferably, the controller station obtains additional information of the actual controlled station involved (e.g. by reading a model number via a network) and adjusts the generic AR to operate optimally for the specific controlled station. As such, ARs can provide APIs for control of families of devices or, optionally, of specific models only. Generally the family-oriented ARs will have a wider range of usage, but the specific ARs allow control of vendor-specific features and capabilities.

For a controlled station an associated AR must be present in the system and running for the controlled station being able to participate. For a BAV device, the AR may be obtained (downloaded) directly from storage in the BAV device or from other storage associated with the BAV device (such as a harddisk located in another station on the network or even via access through a wide area network). In the latter case an indication of the storage location is stored for the controlled station. This indication may be stored in the controlled station itself or in another station, such as a controller station or a central station. For LAV devices, the AR is pre-installed on the controller station or obtained from any storage location. Similarly, also for a controller station in order to be used by applications/features in other stations a running AR is required. Normally, such AR will be running in the controller station itself, although this is not strictly required.

A controller station may also comprise one or more applications (features); shown are applications 270, 272 and 274. The application sends messages to one or more involved ARs. The ARs may be located in the same station, or in another station in which case the message is transferred via the network.

Other software elements may be included in the controller station as well, such as:

A Communication Media Manager 230—allows other elements to perform communication, such as asynchronous and isochronous communication over the network. Preferably IEEE 1394 is used as the network.

Messaging System 232—responsible for passing messages between elements.

Event Manager 234—serves as an event delivery service. An event is the change in state of an object or of the home network.

Stream Manager 236—responsible for managing real-time transfer of AV and other media between functional components.

Registry 238—serves as a directory service, allows any object to locate another object on the home network.

Stations in the system may contain descriptive data (Self-Describing Device data or SDD) about the station and its capabilities. If IEEE 1394 is used as the network, preferably this information follows the IEEE 1212 addressing scheme used for Configuration ROM. The SDD data may include AR code and data for constructing user interface elements.

Communication Media Manager

The Communication Media Manager (CMM, 230) is a medium dependent entity in the network. It interfaces with the underlying communication medium to provide services to other components or application programs residing in the same device as the CMM resides. Each physical communication medium has its own CMM to serve the above purposes. Here the CMM for the IEEE 1394 bus is described in more detail.

Two types of services are provided by the CMM. One is to provide a transport mechanism to send requests to and receive indications from the remote devices. The other is to abstract the bus activities and present the information to the system. The IEEE 1394 bus is a dynamically configurable network. After each bus reset, a device may have a completely different physical ID than it had before. If a network component or an application has been communicating with a device in the network, it may still want to continue the communication after a bus reset, though the device may have a different physical ID. To identify a device uniquely regardless of frequent bus resets, Global Unique ID (GUID) is used by the CMM and other entities. GUID is a 64-bit number that is composed of 24 bits of node-vendor ID and 40 bits of chip ID. While a device's physical ID may change constantly, its GUID is permanent. The CMM makes device GUID information available for its clients.

One of the advanced features of the 1394 bus is its support for dynamic device actions such as hot plugging and unplugging. To fully support this up to the user level, system components or applications need to be aware of these environment changes. The CMM works with Event Manager (EM) to detect and announce such dynamic bus changes. Since any topology change within 1394 bus will cause a bus reset to occur, the CMM can find out the changes and post the event to the Event Manager about these changes along with the associated information. The Event Manager will then distribute related events to all interested entities or applications.

Messaging System

The messaging system 232 provides the software elements with communication facilities. It is independent of the network and transport layers. A messaging system is embedded in any FAV and IAV device. The messaging system of a device is in charge of allocating identifiers for the software elements of that device. These identifiers are firstly used by the software elements for registration. They are then used by the software elements to identify each other within the home network: when a software element (A) wants to send messages to another software element (B) it has to use the software element identifier of B while invoking the messaging system API.

Device Control

In the system according to the invention, an AR should exist for each BAV and LAV device known in that network. The AR provides an interface to the device and presents it as a software element in the architecture. Within an AR several FCMs are contained representing the functional components of the device and which are also presented as software elements in the architecture. Other applications can query the registry to find out the devices and functional components available and to get a software element identifier to allow them to interact with the device via the AR and the FCMs. ARs are handled by a FAV or IAV that can install them. Installation of an AR code unit results in the installation of all the associated FCMs. The code can be written in a standard bytecode, in which case they can be installed on all FAV devices, or in some native code, in which case they can be installed only on (and by) some FAV or IAV that knows that code and is prepared for that kind of code.

Functional Component Module (FCM).

An FCM is a (software) abstraction of a functional component providing the functionality of that functional component to the software environment and applications. Applications will not communicate with a functional component directly but only through the FCM, the FCM on its turn does not communicate with the functional component directly but always via the AR (this is at least the model used to present the relationship; the FCM implementation may communicate with the CMM directly). An FCM is a software object in the sense that it is registered as a receiver in the registry and it can communicate with other objects via the messaging system. Via the messaging system it offers the command protocol according to the conventions of the system.

For the different types of devices, ARs play a different role as summarized below:

A FAV device possibly hosts one AR representing itself and zero or more ARs representing LAV devices and/or BAV devices.

An IAV device possibly hosts one AR representing itself and zero or more ARs representing LAV and/or BAV devices (operating in LAV mode).

A BAV device itself does not host any ARs, but provides an AR Code Unit (see below) in a standardized code. When attached to a network with an FAV, each FAV can upload and install the AR to make the BAV device available to other components. Installation of the AR Code Unit results in the installation of the AR and all FCMs related to the device. The communication between the AR/FCMs and the BAV device goes in a standardized way via the CMM, but the actual communication between the AR/FCM and the device is proprietary to the BAV manufacturer. When attached to a system with no FAV devices but with an IAV device that knows how to handle that BAV, an IAV device can provide an AR Code Unit itself to make the BAV device available to other components. Then, the BAV is said to operate in LAV mode in which case the situation is the same as for a LAV device.

A LAV device itself does not have any notion of ARs. When attached to the main network with an FAV or IAV device that knows how to handle that LAV, one FAV or IAV device has to provide the AR code to make the LAV device available to other stations. How this is done and how the AR/FCMs communicate to the LAV device is completely proprietary to the manufacturer of the FAV or IAV device.

Besides an API to control the device (and its functional components), an AR may also provide a device specific application. This is a general application that is handled by the system as all other applications. By this application, a device manufacturer can provide the user a way to control all special features of the device in a way decided by manufacturer, without the need for standardizing all these features in the system.

AR Managers are responsible for installing new ARs (code units) for new devices attached to the system, e.g., when new devices are attached to the network. A device may consist of more than one functional component; e.g., one device may consist of a tuner and a VCR. For BAV/LAV devices, the installation of its AR Code Unit preferably takes place on a per device basis, not for each AR component separately, so, for an AR manager an AR Code Unit is a single entity for installation, removal and replacement of AR components. Furthermore, one AR Code Unit corresponds to a single BAV/LAV device, i.e. it contains all AR components for that device.

The AR provides a basic service for elementary communication with the BAV/LAV device. Preferably, the AR Manager detects the attachment of a new device and obtains a unique identifier (GUID) of that device; then it can communicate with the device to obtain basic information about the device and to install the AR Code Unit. The AR Manager controls the installation (and later removal) of the AR Code Unit. The installation results in the AR, and FCM objects becoming available for communication with the device via CMM and the provided GUID. On installation, ARs and FCMs make themselves known via the Registry (so that they can be found and used by other applications via the messaging system).

The communication between the AR components and the CMM is based on the GUID of the BAV/LAV device. The CMM provides only the GUID for communication with the device to be used by all AR Components. In this case, the CMM does not need to have any knowledge about the structure of functional components within the BAV/LAV device. This simplifies the communication between an FAV/IAV and a BAV/LAV device, makes the standardization effort smaller, and increases the possibilities for using proprietary protocols. The AR components themselves are responsible for the proper use of the CMM, i.e. for interleaving the communication in a proper way and the distribution of messages received from the BAV device to the proper AR components.

The content of the AR Code Unit is preferably standardized so that each AR Manager can handle AR Code Units for arbitrary BAV/LAV devices. The AR Code Unit may be a kind of self-extracting package, for instance in a standard bytecode; it provides the AR Manager with handles for installation and removal. The AR Manager just calls the install handle (providing the device's GUID for communication with the device via the CMM) on which the AR Code Unit itself is responsible for installing all its AR Components on that same device. Similar, the remove handle provides the AR Manager with a handle to remove all AR components within the AR Code Unit. This allows maximum freedom for the BAV manufacturer in structuring their AR Code Units.

AR Manager

The AR management system is responsible for installing and uninstalling AR code units for the control of controlled stations (BAV and LAV devices) that are directly connected to a network. AR management is collectively performed by the AR Managers on all controller stations (FAV and IAV devices). AR code units for controller stations are managed by the stations themselves in a proprietary manner. Stations which are not connected to the network, but instead use another communication medium, such as a proprietary network or different higher level protocols operating over the same medium, are preferably managed by the controller stations in a proprietary manner. Each controlled station shall be facilitated by an AR code unit installed on a controller station, referred to as host.

An AR code unit may be accompanied by a profile, which includes an indication of the runtime size needed by the AR code unit and its components.

Each AR Manager offers a number of methods that can be invoked by software elements, and a number of global events that notify the results of AR code unit installation and uninstallation. Most AR management activities are triggered by a network reset event, which is typically generated when the network topology changes or a device is (de)activated. Such an event will be generated if, e.g., a device is added to or removed from the network, if the network is split into two smaller ones, or if two networks are connected into one. Alternatively, other events may trigger the management activity, e.g. a user requesting a re-installation.

AR Management Protocol

Preferably, the AR management system is constructed from a distributed group of AR Managers on the controller stations. AR Managers interact on a peer-to-peer basis to implement the provided service, while using the required services of local system elements. These are CMM, Messaging System, Event Manager, and AR code units. Preferably, each AR Manager can read SDD data directly from stations connected on the network. The protocol supports the use of storage and Internet access facilities. In the remainder the distributed AR Management Protocol is described in more detail. In this protocol in two steps a leader is selected (an 'initial' leader can hand over its responsibility to a more capable 'final' leader). The final leader assigns AR code units to controller stations. It should be noted that instead of a distributed approach, also a partially or entirely centralized approach for the AR Management may be used. For instance, a central station may be set as default or set by a user to act as the final leader, making both leader election phases redundant. Alternatively, a central station may be assigned as the initial leader, using only below described protocol for the final leader election. However, particularly in CE systems with products of various suppliers and rapid introduction of digital techniques, it is difficult to perform a suitable assignment of a 'central' leader station (TV, versus PC versus set-top box) or manufacturer of such a device. Moreover, a system may at certain moments include more than one 'central' station. To avoid such situations, the distributed approach is preferred. Nevertheless, it will be understood that a person skilled in the art can implement a centralized approach based on the information provided for the distributed approach.

After a trigger for installation, each AR Manager starts with a procedure for electing an initial leader. One AR Manager will be selected as the leader. All AR Managers are followers, and subordinate to the leader (thus, the leader AR Manager also plays the role of a follower in the protocol). Leader and followers subsequently perform AR code unit installations autonomously. This process will normally terminate if AR code units have been installed for all controlled stations in the network. The leader will control most of the protocol activities.

With respect to the leader election, there are three IAV variants; one supporting the full AR Manager; one said to be in a dummy mode, supporting only the leader election process; and one not supporting any AR management activity. The dummy variant does not participate in the other AR management activities except the leader election. AR Managers can support URL access facilities, and may announce this during the leader election. It is preferred that FAV devices capable of doing this announce so. IAV devices may, but need not announce such a capability. Any device announcing such a capability can be selected as the leader.

Leader Election

After a host device is powered up, or after a network reset event (or other trigger causing an installation/removal) is received, each AR Manager will enter or re-enter this activity. (For the 1394 network, a reset or power up/down of a device causes network resets events on all other host devices.) The AR Manager retrieves the identifiers, such as GUIDs, of all stations in the system, for instance from the SDD data of the stations. Additionally other relevant data from the SDD data fields of all devices (GUID, Model_Vendor_ID, Model_ID, Device_Type) may be retrieved. Devices without the identifier are classified as LAV controlled stations.

From all host identifiers, based on a predetermined criterion one is selected and the AR Manager on the device with this identifier is declared the initial leader. For instance the highest or lowest identifier may be chosen. Preferably, the highest bit order-reversed identifier is calculated. The reversion prevents that in systems where the identifier comprises at a high order location a vendor identifier, devices from certain vendors will usually act as the initial leader in most network configurations. Note that all devices read the same identifier list, and will declare the same AR Manager as initial leader. At this time, each AR Manager knows if it is the initial leader or an initial follower. Each device knows which other AR Managers there are.

The initial leader behaves as follows to select and announce the final leader: it obtains the capability of all identified initial followers (e.g. by awaiting a message informing it of the capability or by requesting it). Preferably, the capability indicates whether the device has URL access capability or not. More in general, the URL capability represents the level of reprogrammability offered by the station, i.e. is the station able to retrieve an AR from a storage unit outside the controller station or from a storage means inside the controller station whose content can be updated. A distinction may be made between the various forms of retrieving (e.g. via Internet, via a local network, from a harddisk, from a reprogrammable electronic memory (e.g. non-volatile RAM, or EEPROM), or from a non-reprogrammable but exchangeable memory means, wherein the memory function can be relatively easily replaced (e.g. a new program CD in a CD-ROM player, or a ROM-memory card in a card-reader)). The capability may also provide performance data, such as a CPU speed and amount of main memory available for executing ARs. Optionally, the capability may indicate whether the station is a dummy IAV device or not. Considering the URL access capabilities and which devices are dummy IAV devices, the selection of the final leader may be as follows:

If there are FAV devices with a declared URL access capability, one of them is selected.

Otherwise, if there are IAV devices with a declared URL access capability, one of them is selected.

Otherwise, if there are FAV devices, one of them is selected.

Otherwise, if there are IAV devices not in dummy mode, one of them is selected.

Otherwise, any of the dummy IAV devices is selected.

It will be appreciated that where equally suitable candidates are found, the additional capability indicators, such as performance, can assist in selecting a most suitable one of the candidates.

All initial followers are informed of the final selection, e.g. by sending a message DMLeaderDeclaration(<selected final leader>, <identified dummy devices>). Preferably, the final leader is the last one to which this message shall be sent, for synchronization purposes.

An initial follower behaves as follows to assist in the election of the final leader. The initial follower makes available its capability to the initial leader, e.g. by sending a message DMCapabilityDeclaration(<my capability>) to the initial leader. Preferably, the message is resent every 3 seconds until a message DMLeaderDeclaration is received, for synchronization purposes. The timeout period is not critical, and may be increased after a timeout. When the initial leader informs it (e.g. by a message DMLeaderDeclaration(<selected final leader>, <identified dummy devices>)), it knows which AR manager is the final leader, and which ones are dummy IAV devices.

At the end of the procedure, the initial leading and following AR Managers know which one is the final leader, and which others are the final followers. If there are only dummy mode devices on the network, the protocol operation terminates at this point. Otherwise, the autonomous operation starts.

If the final leader has no URL access capability, it can immediately decide that any request involving a URL can not be accomplished in the entire network. A leader with URL access capability fetches all URL-designated AR code unit profiles. These profiles are sent to all controller stations to enable them to determine whether they can host the AR code unit that corresponds to the profile. If requested by an AR Manager, an AR code unit will be fetched and forwarded to the requester.

The <identified dummy devices>list is used by the final leader to prevent it from sending messages to dummy devices. Dummy devices only support the leader election part of the protocol. The AR Manager on a dummy IAV device need not be sent any other messages.

Autonomous Operation of the Leading Controller Station

After the leader election has completed, the final leader will take the initiative to handle AR code installations. The leader preferably controls the operation as follows, for each controlled station found in the network. To each final follower a message DMInquiry is sent, requesting the installation of a specified AR code unit (the specification may be based on the GUID of the controlled station). The first inquiry preferably does not contain a URL-retrieved profile, in order to prevent unnecessary URL access. From all received inquiry records, the leader preferably learns the following:

The preferences for the controlled station, if any (established according to the rules described below).

For each host, whether the controlled station is from the same vendor, and whether it can install a proprietary AR code unit for the controlled station.

For each host, whether an AR code unit is installed for the controlled station.

For each host, the number of installed AR code units.

Based on this information, the leader decides for each controlled station on which controller station the AR of the controlled station should be executed. It assigns the AR to the controlled station using the DMCommand message.

If no installed AR code unit was found for a controlled station, the leader preferably sends another DMInquiry and additional DMCommand messages to all or some followers, and proceeds to install an AR code unit. The result of this installation attempt may be notified by the installing AR Manager posting an ARInstallIndication event.

If a final follower receives a DMInquiry or DMCommand message from the final leader, it shall handle it, and return the achieved result to the final leader. Preferably, an AR code unit notifies its local AR Manager of its uninstallation.

AR Code Unit Installation and Uninstallation

The decisions of the AR management system as the result of an installation trigger (e.g. network reset event) have been discussed above, giving a default installation procedure. These decisions can be overruled by preferences. The preferences provide information regarding the wishes of a controlled station to deviate from the default installation procedure. The preferences are stored in the system in association with the controlled station. The preferences may be stored in the controlled station itself (e.g. as part of the SDD data). Since controller stations are in general more powerful, typically, the preferences are stored locally on AR Managers in one or more controller stations. Also a central station may be used for storing the preferences.

For each controlled station at most one installed AR code unit is actively running in the entire network. Due to resource shortage problems, it can occur that no AR code unit is installed for some controlled station(s) in the network. It can also occur that an AR code unit uninstalls itself for some reason. Preferably, another host will be selected for a controlled station's AR code unit if the previous host is removed from the network. An AR code unit is uninstalled if the corresponding controlled station is no longer available in the network.

The AR manager in the selected leader preferably controls the installation of an AR code unit according to the following scheme. If there is a host of the same vendor as of the controlled station, and the host is able to control the controlled station, then such a host is selected to install an AR code unit in a proprietary way for the controlled station. Otherwise, if there is an available AR code unit for the controlled station, a FAV host is selected to load and install the AR code unit. If this fails, any host that can install an (embedded) AR code unit for the controlled station in a proprietary way is selected.

A BAV device may internally store an AR code unit and/or a URL for such a unit, for instance in its SDD data. If a URL for an AR code unit is specified in a BAV device, it is loaded from the specified location and installed on a FAV host, instead of the AR code unit contained in the BAV device itself. If the loading fails, the AR code unit contained in the BAV device is loaded and installed instead.

If some controller stations in principle are equally suitable to execute a given AR, preferably, one of these controller stations with the lowest number of already installed AR code units is selected (distribution of load over the system).

A so-called URL (Universal Resource Locator) may be used for indicating the location of an AR. The general syntax of a URL is scheme://host.domain:port/directory/filename, with some parts optional. The scheme can be, for example, http or file. The URL denotes an AR code unit and/or its profile on the Internet or on a (persistent) storage medium.

Preferences

The activities of the AR management system are guided by preferences, which can be set by applications or users.

Preferences typically specify deviations from the above sketched default installation activities. Two methods are available for setting and retrieving preferences on AR Managers in the system. Preferences are optional, meaning that AR management will function without any set preference. If a preference is set for some controlled station (e.g. stored in a controller station), it is preferably stored persistently, so that it does not have to be entered each time the network or some device is powered up. Preferences are modifiable by, for instance, the user.

The following three preferences for AR management may beneficially be used, each of which may be associated with either a single controlled station (for instance by its Global Unique Identifier, or GUID) or with a controlled station model (by its Vendor Model Identifier, or VMID). For a LAV controlled station, only the first variant may be possible, since a VMID may not be available for LAV devices. A GUID-based preference for a controlled station overrules a VMID-based preference for the controlled station model, if any, without causing a conflict.

| Preference | Type |
|---|---|
| ARPreferVendorHost | boolean |
| ARPreferredHost | GUID |
| ARPreferredURL | String |

ARPreferVendorHost—A designation whether a host of the same vendor as the controlled station is preferred for installing an AR code unit. If for any controlled station or controlled station model the value is set to true with any AR Manager, the AR management system shall give preference to a host of the same vendor.

ARPreferredHost—A designation of a specific host that is preferred for installing an AR code unit for some controlled station or controlled station model. The reason for setting this may, for instance, be performance or reliability considerations.

ARPreferredURL—A URL (or similar way for) designating the location of an AR code unit and its profile for a controlled station or controlled station model. For a BAV controlled station, this preference is used to specify an AR code unit to be installed instead of an AR code unit designated by a URL in the BAV device, or the AR code unit contained in the BAV device. For a LAV controlled station, it is used to specify an AR code unit that can be installed on a FAV host.

If preferences for one controlled station are stored in more than one controller station, it can occur that conflicting values are set. In this case one of the values may be selected arbitrarily. Preferably, for ARPreferVendorHost, the value true is selected in case of a conflict. Advantageously, conflict situations are reported, allowing the user or the system to resolve the conflict by adjusting the preference.

It will be understood that normally preferences take effect upon network reset events, and upon invoking (un) installation requests, not at the time they are set. Advantageously, there is a priority among the preferences to resolve ambiguities. The following list gives the preferred order in which AR code unit installation attempts are performed by the AR manager of the leading station for a given controlled station:

1. If <ARPreferVendorHost> is true, try a host from the same vendor as the controlled station (proprietary AR code unit). If applicable, <ARPreferredHost> will also be taken into consideration, provided it is in the set of the vendor hosts.
2. If <ARPreferredHost> is specified, try that host (embedded or uploadable AR code unit). If applicable, <ARPreferredURL> is also taken into consideration, provided <ARPreferred Host> is a FAV device.
3. If <ARPreferredURL> is specified, try the URL-designated uploadable AR code unit on any FAV host.
4. Try a URL-designated uploadable AR code unit in the BAV device on any FAV host (only applies to BAV controlled stations).
5. Try a BAV-contained uploadable AR code unit on any FAV host (only applies to BAV controlled stations).
6. Try a proprietary AR code unit on any host.

What is claimed is:

1. A communication system including a plurality of controller stations and at least one controlled station; the stations being interconnected via a communication network; functionality of each controlled station being associated with a respective abstract representation, referred to as AR, which provides an interface for software elements in the system to control functionality of the controlled station by means of messages exchanged with the AR via the communication network; characterized in that the communication system includes leader selection means for selecting a single one of the controller stations as a leading controller station; and in that each controller station includes:

AR distribution means for determining which controller station should execute the AR(s) of the respective controlled station(s); the AR distribution means being operative to, if located in a leading controller station, assign each AR at most to one of the controller stations; and control means for executing at least one AR assigned to the local controller station.

2. A communication system as claimed in claim 1, wherein the communication system includes means for storing for each respective one of the controller stations an associated unique identifier; each controller station including respective leader selection means; each leader selection means being operative to obtain the unique identifiers of all controller stations and determining, based on the identifiers, whether its local controller station is the leading controller station or not.

3. A communication system as claimed in claim 2, wherein the unique identifier comprises at least a lower portion with least significant bits of the identifier and a higher portion; the higher portion comprising a vendor and/or manufacturer identification; the leader selection means being operative to perform the determination by comparing a value derived from the identifier associated with its own controller station with values derived from the identifiers associated with other controller stations; each of the values substantially being formed by bit reversing the corresponding identifier.

4. A communication system including a plurality of controller stations and at least one controlled station; the stations being interconnected via a communication network; functionality of each controlled station being associated with a respective abstract representation, referred to as AR, which provides an interface for software elements in the system to control functionality of the controlled station by means of messages exchanged with the AR via the communication network; characterized in that the communication system includes leader selection means for selecting a single one of the controller stations as a leading controller station; and in that each controller station includes:

AR distribution means for determining which controller station should execute the AR(s) of the respective controlled station(s); the AR distribution means being operative to, if located in a leading controller station, assign each AR at most to one of the controller stations; and control means for executing at least one AR assigned to the local controller station; and the communication system comprises means for storing for each respective one of the controller stations an associated capability indicator, the capability indicator indicating a suitability of the associated controller station to act as the leading controller station; the leader selection means being operative to, if located in the leading controlling station;

obtain the capability indicators associated with each of the controller stations;

determine which of the controller stations is a most capable one; and re-assigning the role of leading controlling station to a most capable station.

5. A communication system as claimed in claim 4, wherein the capability indicator indicates whether or not the associated controller station is capable of retrieving an AR from a storage means located outside the controller station or from a storage means inside the controller station whose content can be updated; the leader selection means ranking a controller station with such a retrieving capability as more capable than a controller station without such a retrieving capability.

6. A controller station for use in a communication system including a plurality of controller stations and at least one controlled station; the stations being interconnected via a communication network; functionality of each controlled station being associated with a respective abstract representation, referred to as AR, which provides an interface for software elements in the system to control functionality of the controlled station by means of messages exchanged with the AR via the communication network;

characterized in that the communication system includes leader selection means for determining whether the controller station is a leading controller station; and in that the controller station includes:

AR distribution means for determining which controller station should execute the AR(s) of the respective controlled station(s); the AR distribution means being operative to, if the controller station has been selected as the leading controller station, assign each AR at most to one of the controller stations in the system; and control means for executing at least one AR assigned to the controller station.

7. A controller station as claimed in claim 6, wherein the controller station includes the leader selection means; the leader selection means being operative to obtain unique identifiers of all controller stations in the system and determining, based on the identifiers, whether the controller station is the leading controller station or not.

* * * * *